(12) United States Patent  (10) Patent No.: US 7,871,278 B1
Herring et al.  (45) Date of Patent: Jan. 18, 2011

(54) CONNECTOR BLOCKING WITH AUTOMATIC POWER MANAGEMENT AND BALANCING

(75) Inventors: Dean F. Herring, Youngsville, NC (US); P. Daniel Kangas, Raleigh, NC (US); David J. Steiner, Raleigh, NC (US); Jeff D. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/637,986

(22) Filed: Dec. 15, 2009

(51) Int. Cl.
 *H01R 13/44* (2006.01)
(52) U.S. Cl. .................... 439/136; 439/911
(58) Field of Classification Search ............... 439/136, 439/540.1, 911; 200/50.1, 50.12, 50.13, 200/51.07, 51.08, 61.7
See application file for complete search history.

(56) References Cited

U.S. PATENT DOCUMENTS

| | | | | |
|---|---|---|---|---|
| 399,326 | A * | 3/1889 | Griggs | 200/51.1 |
| 2,288,241 | A * | 6/1942 | Holcomb | 439/133 |
| D210,536 | S * | 3/1968 | Paganelli et al. | D8/353 |
| 3,908,103 | A * | 9/1975 | Gyurka | 200/50.28 |
| 4,984,982 | A * | 1/1991 | Brownlie et al. | 439/131 |
| 5,680,926 | A * | 10/1997 | Sandor et al. | 200/51.08 |
| 5,931,949 | A | 8/1999 | Perlman et al. | |
| 5,980,279 | A * | 11/1999 | Muller | 439/142 |
| 5,983,357 | A | 11/1999 | Sun | |
| 6,038,125 | A | 3/2000 | Anzai | |
| 6,086,430 | A | 7/2000 | Amoni et al. | |
| 6,334,793 | B1 | 1/2002 | Amoni et al. | |
| 6,425,028 | B1 | 7/2002 | Fosmo | |
| 6,541,718 | B2 * | 4/2003 | Burkholder et al. | 200/50.28 |
| 6,857,896 | B2 * | 2/2005 | Rupert et al. | 439/489 |
| D516,513 | S * | 3/2006 | Kissinger et al. | D13/139.4 |
| 7,039,820 | B2 | 5/2006 | Armstrong et al. | |
| 7,047,430 | B2 | 5/2006 | Chang | |
| 7,290,171 | B2 | 10/2007 | Saotome | |
| 7,312,393 | B2 * | 12/2007 | McCarthy | 174/53 |
| 7,417,985 | B1 | 8/2008 | McCrosky et al. | |
| 7,451,328 | B2 | 11/2008 | Hsieh | |
| 7,467,315 | B2 | 12/2008 | Chang | |
| 7,519,840 | B2 | 4/2009 | Lim et al. | |

FOREIGN PATENT DOCUMENTS

| | | |
|---|---|---|
| JP | 2004213392 A | 7/2004 |
| JP | 2006229514 | 8/2006 |

* cited by examiner

*Primary Examiner*—T C Patel
*Assistant Examiner*—Vladimir Imas
(74) *Attorney, Agent, or Firm*—Jason O. Piche; Jeffrey L. Streets

(57) ABSTRACT

A method and apparatus are disclosed for managing power to a group of connectors. The individual power limits of the connectors may be selectively increased while still complying with a group power limit. In one embodiment, a group of electronic connectors disposed on a host device each include a power portion and a data portion. A mechanical barrier is moveable into a blocked position for physically blocking at least the power portion of one or more of the electronic connectors while the other electronic connectors in the group remain unblocked. A power controller automatically increases an individual power limit of one or more of the unblocked electronic connectors in response to the mechanical barrier being in the blocked position.

19 Claims, 5 Drawing Sheets

CONNECTOR BLOCKING WITH AUTOMATIC POWER MANAGEMENT AND BALANCING

BACKGROUND

1. Field of the Invention

The present invention relates to electronic connectors, and more specifically to systems and methods for controlling power to a group of electronic connectors.

2. Background of the Related Art

Computer systems commonly include input/output (I/O) ports for interfacing with peripheral devices. A peripheral device physically interfaces with a system using a connector, having a structure which provides both mechanical and electrical connection. For example, a connector receptacle on a host device may mechanically receive a connector plug of a peripheral device. The mechanical connection brings electrical contacts on the receptacle into connection with corresponding electrical contacts in the plug. This electrical connection allows power and data communication between the system and the peripheral device.

Connectors for I/O ports often provide electrical power in combination with I/O signaling. For example, a universal serial bus (USB) connector on a host device may provide a single receptacle providing separate conductors for power and data communication. The USB receptacle on the host device receives a plug of a peripheral device, such as a plug on the end of a cable extending from the peripheral device. A Powered-USB connector, by comparison, includes separate power and data receptacles. The data receptacle may be a standard USB receptacle providing both data and low-power output, while the power receptacle may be a non-standard receptacle providing additional power. USB and Powered-USB are just two examples of the wide variety of I/O connectors known in the art.

A system-level power budget is typically assigned to a computer system, either by a system designer or according to regulations set by a standards body, or both. To meet the system-level power budget, each connector's power output is also limited. The power output of individual connectors may also be limited, irrespective of the system-level power budget. For example, a USB connector is generally limited to a specific power limit prescribed by regulations. The power limit is sufficient to power certain low-consumption devices, while many higher-power USB peripheral devices still require an external power supply. Powered-USB was developed, in part, to provide additional power to higher-consumption devices, such as point of sale (POS) devices. The additional power receptacle provides additional power to a peripheral device without the use of an external power supply. However, even Powered-USB connectors are limited by the system-level power budget and individual connector power limits prescribed by regulations. Retail and POS devices are required to comply with these limits.

BRIEF SUMMARY

According to one example embodiment of the present invention, a system includes a group of electronic connectors disposed on a host device. Each electronic connector includes a power portion for carrying electrical power and a data portion for carrying data. A power supply on the host device supplies power to the electronic connectors. A blocking mechanism includes a mechanical barrier moveable into a blocked position for physically blocking at least the power portion of one or more of the electronic connectors while the other electronic connectors in the group remain unblocked. A power controller is configured for controlling power to the group of electronic connectors. The power controller is also configured for automatically increasing an individual power limit of one or more of the unblocked electronic connectors in response to the mechanical barrier being in the blocked position.

Another embodiment of the present invention provides a method. According to the method, electrical power is provided to a group of electrical connectors. One or more of the electrical connectors is blocked while the other electronic connectors in the group remain unblocked. An individual power limit of one or more of the unblocked electronic connectors is automatically increased in response to the blocking.

DETAILED DESCRIPTION

Embodiments of the present invention include electromechanical systems and methods of managing power to a group of connectors, wherein the individual power limits of the connectors may be selectively increased while still complying with a group power limit. Embodiments of the invention include various blocking systems for physically blocking at least a power portion of one or more connectors and automatically increasing power output limits of unblocked connectors. Various replaceable and/or movable mechanical barriers are disclosed, along with electronic control circuitry that adjusts power to the connectors in response to the positioning of the mechanical barriers. Power to unblocked connectors may be automatically increased, while power to blocked connectors may be shut off. The disclosed electro-mechanical solutions provide backward compatibility to I/O devices and system units that do not have elaborate power sensing capabilities. The mechanical blocking allows existing "power unaware" I/O devices to be accommodated even though such power unaware devices may not have any internal software or other electrical ways to signal their power capabilities to the system unit.

According to various embodiments of the present invention, a single group power limit may be enforced by dynamically apportioning the group power limit among the unblocked connectors. In one embodiment, the group power limit is evenly apportioned so that if one or more connectors in a group are blocked, the individual power limits of the remaining, unblocked connectors are increased by the same amount. In another embodiment, the individual power limits are increased for only a subset of the unblocked connectors, while one or more other unblocked connectors may remain at a fixed, lower power limit. In any case, the group power limit is enforced, which helps satisfy a system power budget. For example, the power output of one connector in a group can be automatically increased for powering a high powered video display when an adjacent connector is blocked, without exceeding the group power limit and, accordingly, without exceeding the system power budget.

Figure 1:
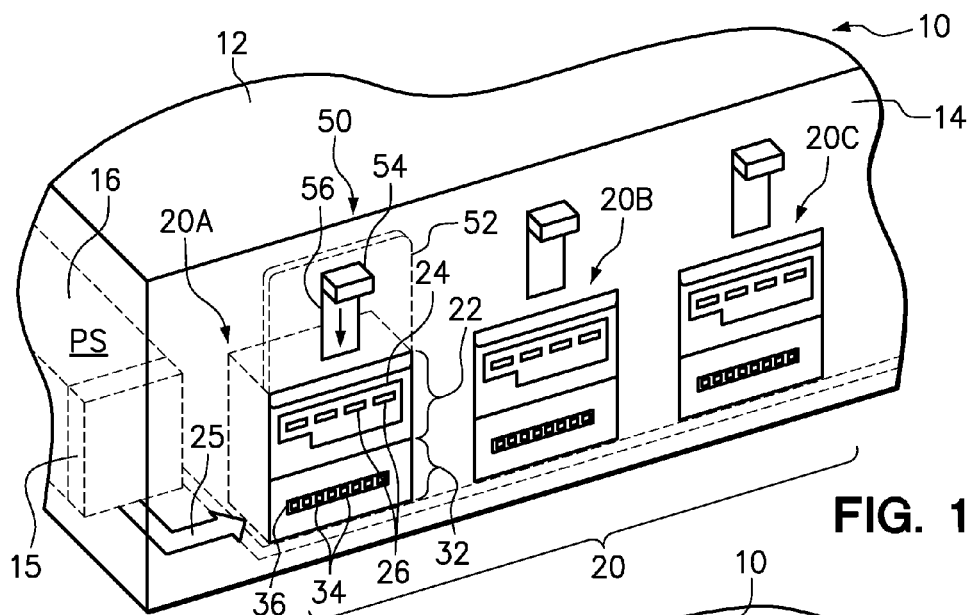
FIG. 1 is a perspective view of an electronic system providing selective blocking and power management to a group of electronic connectors on a host device.

FIG. 1 is a perspective view of an electronic system 10 providing selective blocking and power management to a group of electronic connectors 20 on a host device 12. The host device 12 may be, for example, a computer system used at a point-of-sale location in a retail environment. The host device 12 has a panel 14 from which the group of connectors 20 is externally accessible. The connectors 20 in the group are individually designated as connectors 20A, 20B, and 20C. While only three connectors 20 are shown by way of example, one skilled in the art will appreciate that the concepts discussed may be applied to systems having more than three connectors in a group, or as few as two connectors in a group. Details of one of the connectors 20A that would normally be hidden behind the panel 14 are shown by way of reference using a dashed line type. Selected other elements of the host device 12, such as a power supply 16, a power controller 15, a printed circuit board 18, and a blocking mechanism 50 for selectively blocking the connectors 20 are also shown in a dashed line type.

By way of example, the connectors 20 on the host device 12 are illustrated as host-side, Powered-USB type connectors 20. Powered-USB connector systems, alternatively referred to as "Retail USB," "USB PlusPower," and "USB+Power," are commonly used in retail environments to provide both power and data capabilities to a compatible peripheral device. Common examples of Powered-USB peripheral devices known in the art (not shown) include receipt printers and barcode readers. Technical specifications of Powered-USB systems are provided at http://www.poweredusb.org. Each powered-USB connector 20 includes a power portion 22 and a data portion 32. The data portion 32 of each connector 20 is operable for carrying standard USB data signaling, the technical specifications for which may follow a USB specification provided at http://www.usb.org. The standard four USB conductors of the data portion 32 may consist of two signal conductors, one 5-volt power conductor, and one ground conductor. The power portion 22 is operable for carrying non-standard USB power signaling, which provides an additional amount of power for operating peripheral devices that may require more power than the limited amount of power provided under a standard USB connector, alone. For example, according to standard USB specifications, the data portion 32 may provide electrical power at 5 volts and up to 0.5 amperes. This amount of power may be sufficient to power lower-power devices without the use of the power portion 22. According to Powered-USB specifications, the power portion 22 may provide 30 watts of power at 5 volts, 72 watts of power at 12 volts, or 144 watts of power at 24 volts, at up to 6 amperes.

The power portion 22 includes a host-side power receptacle 24 having a plurality of power contacts 26. The data portion 32 includes a host-side data receptacle 34 having a plurality of data contacts 36. The host-side power receptacle 24 is configured to receive a peripheral-side power plug, and the host-side data receptacle 34 is configured to receive a peripheral-side data plug. The peripheral-side power and data plugs for a Powered-USB type peripheral device are generally known in the art. Peripheral-side power and data plugs are typically provided at the end of a Powered-USB cable extending from the peripheral device, and plug into the respective host-side receptacles 24, 34 on the host device 12. In another embodiment, host-side power and data plugs, which may have a unitary plug housing, may instead be provided with a host device, for connecting to corresponding peripheral-side power and data receptacles provided on a peripheral device.

The power supply 16 provided on the host device 12 converts electrical power, such as 120V alternating current (AC), to a direct current (DC) form usable by the connectors 20. The power supply 16 may have multiple stages, such as a first stage providing power factor correction and converting an AC input voltage to a DC bulk voltage, and a second stage converting the DC bulk voltage to a specified DC output voltage to each of the connectors 20. The connectors 20 are internally mounted on a printed circuit board (PCB) 18 of the host device 12, typically using an array of pins (i.e. a pin grid array) on a surface of the connectors 20 facing the PCB 18. The PCB 18 provides electrical pathways, as generally understood in the art, for communication of power and data signaling to the connectors 20, as generally indicated at 25. The power supply 16 supplies power to the connectors 20 over the PCB 18 or other medium. The schematically-shown power controller 15 controls the flow of electrical power between the power supply 16 and the electrical connectors 20 over the PCB 18. The power controller 15 may be used to control the flow of power to the connectors 20 individually and as a group, as further explained below.

A blocking mechanism 50 is provided for selectively blocking the connectors 20. The blocking mechanism 50 in this embodiment includes a plate-like mechanical barrier 52 movably supported on the panel 14 of the host device 12. A separate mechanical barrier 52 is optionally provided for each connector 20A, 20B, and 20C, with details of one mechanical barrier 52 for selectively blocking the connector 20A shown using a dashed line type. The mechanical barrier 52 is optionally disposed within the host device 12 behind the panel 14 in this embodiment. A handle 54 secured to the mechanical barrier 52 extends through an aperture 56 in the panel 14. The handle 54 is externally accessible by hand for moving the mechanical barrier 52 into and out of a blocked position (see FIG. 2). In FIG. 1, the mechanical barrier 52 in front of each connector 20 is positioned in an upward, unblocked position, such that all of the connectors 20 are unblocked. The mechanical barrier 52 may be held in the unblocked position, such as by friction between the mechanical barrier 52 and the panel 14, for example. With the mechanical barriers 52 in the unblocked position, a peripheral-side plug of corresponding type may be plugged into any of the connectors 20.

Figure 2:
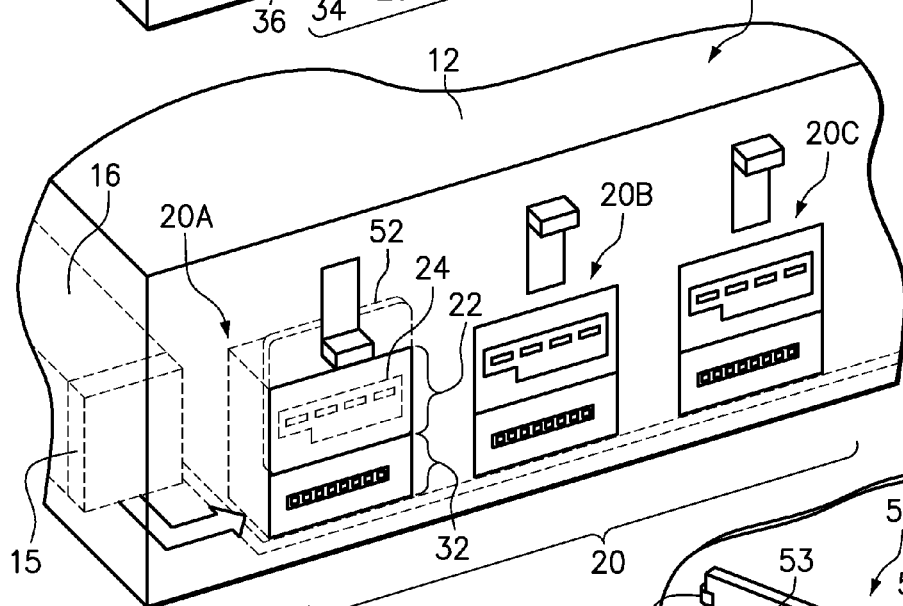
FIG. 2 is a perspective view of the electronic system with the mechanical barrier of the blocking mechanism moved to a blocked position.

FIG. 2 is a perspective view of the electronic system 10 with the mechanical barrier 52 in front of the connector 20A moved downward to a blocked position. In the blocked position, the mechanical barrier 52 blocks the power receptacle 24 of the connector 20A from receiving a peripheral-side plug. A peripheral device is thereby blocked from being connected to the power portion 22 of the connector 20A. The data portion 32 is still accessible in this example, although the mechanical barrier 52 may alternatively be configured to also block the data portion 32 of the connector 20A when in the blocked position. The data portion 32 optionally still has USB data capabilities when only the power portion 22 is blocked, as shown. Thus, the unblocked, standard USB data portions 32 may each continue to provide the standard 5 v DC power output. The other connectors 20B and 20C in the group remain unblocked, so that the power portions 22 and data portions 32 of the unblocked connectors 20B, 20C are still enabled and accessible.

The power controller 15 is configured for automatically increasing an individual power limit of one or more of the unblocked connectors (connectors 20B and 20C in FIG. 2) in response to the mechanical barrier 52 being in the blocked position in front of the connector 20A. For example, the controller 15 may increase the individual power limit of the unblocked connector 20B, the unblocked connector 20C, or both. In accordance with raising the individual power limits, the power portions 22 of the unblocked connectors 20B, 20C may be increased from one of the lower power settings to one of the higher power settings provided under Powered-USB specification, such as from 30 watts of power at 5 volts to either 72 watts of power at 12 volts or 144 watts of power at 24 volts. In another embodiment, the power portions 22 of the unblocked connectors 20B, 20C may be increased to a level even greater than the power settings currently provided under the Powered-USB specification, so long as the group power limit is enforced. The controller 15 may also shut off power to the blocked connector 20.

One practical use for increasing power to one or more unblocked connectors is to allow a peripheral device having a higher power requirement to be connected to and powered by one of the unblocked connectors 20B, 20C, without exceeding a group power limit. In one example configuration, the controller 15 simultaneously enforces both a group power limit for the connectors 20 and individual power limits for each connector 20A, 20B, and 20C. In one example configuration, the controller 15 may dynamically apportion the group power limit among the unblocked connectors. For example, assuming the group of connectors 20 includes only the three connectors 20A, 20B, 20C shown, a group power limit of 100 W may be specified for the group of connectors 20, with a corresponding individual power limit of 33 W for each connector 20A, 20B, and 20C when all three of the connectors 20 are unblocked. When one of the connectors 20A is blocked, as in FIG. 2, then power to one or both of the unblocked connectors may be increased. Thus, a device requiring 50 W of power, which ordinarily could not be sufficiently powered by a 33 W connector, may be powered by blocking the connector 20A and plugging the device into one of the unblocked connectors 20B, 20C whose power limits have each been raised to 50 W. In one example configuration, the controller 15 may apportion a group power limit in an evenly balanced manner among the unblocked connectors. For example, in response to blocking the connector 20A of FIG. 2, a group power limit of 100 W may be apportioned in a balanced manner by increasing the individual power limit of each unblocked connector 20B and 20C by the same amount, to 50 W each. According to such a balanced apportionment of the group power limit, any of the available, unblocked connectors would be expected to provide the same amount of power.

Enforcing the group power limit does not require a balanced apportionment of power among the unblocked connectors, however. In another example configuration, the individual power limits may alternatively be increased for fewer than all of the unblocked connectors. For example, in response to blocking the connector 20A of FIG. 2, a group power limit of 100 W may be enforced by increasing an individual power limit of the unblocked connector 20B (adjacent to the blocked connector 20A) to 67 W, without increasing the 33 W individual power limit of the unblocked connector 20C. This would effectively double the power output of the connector 20B in response to the adjacent connector 20A being blocked. The unblocked connector 20C would then have the same individual power limit, regardless of whether the other connectors 20A, 20B were blocked or unblocked. A practical application of such a configuration would be to provide a "standard," expected amount of power to one or more unblocked connectors, to allow for attaching a peripheral device designed to be powered according to that standard amount of power. When desired, a higher-power device that requires more than the standard amount of power could then be used with the host device 12 at connector 20B, upon blocking the connector 20A to increase the power limit of the connector 20B. The higher-power device could be plugged into and powered by the connector 20B, while a standard-power peripheral device could be plugged into and powered by the connector 20C.

Figure 3:
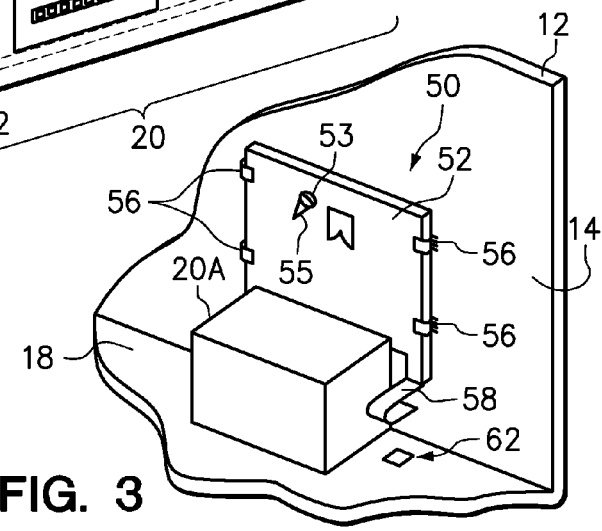
FIG. 3 is a rear perspective view of the connector and blocking mechanism with the mechanical barrier moved to the unblocked position.

FIG. 3 is a rear perspective view of the connector 20A and blocking mechanism 50 with the mechanical barrier 52 raised to the unblocked position. In the example embodiment of FIGS. 1-3, the mechanical barrier 52 has a flat and plate-like form, and is slidably mounted to the rear of the panel 14 inside the host device 12. An example attachment is illustrated as including retainer tabs 56, which retain the mechanical barrier 52 in sliding engagement with the panel 14. The retainer tabs 56 may firmly engage the mechanical barrier 52 to provide frictional contact between the mechanical barrier 52 and the panel 14 and/or between the mechanical barrier 52 and the retainer tabs 56 to hold the mechanical barrier in place against the panel 14 in either the blocked position or unblocked position. The retainer tabs 56 constrain the mechanical barrier 52 to being translated in a linear (in this case, up/down) direction. The retainer tabs 56 represent a relatively simple and inexpensive manner of slidably securing the mechanical barrier 52 in a linearly-translating manner to the host device 12, although one skilled in the art may recognize alternative ways to secure the mechanical barrier 52 in a linearly translating manner, such as using rails or a track, that are also within the scope of the present invention. Screw holes (not shown) may be provided on the mechanical barrier 52 and panel 14 for retaining the mechanical barrier 52 in either the blocked or unblocked position using a threaded fastener.

A spring finger 58 extends from the mechanical barrier 52. When the mechanical barrier 52 is moved down to block the upper portion of the Powered-USB connector (see FIG. 2), the spring finger 58 makes contact with a pad 62 on the PCB 18, shorting the pad 62 to ground. This short signals the controller 15 (FIG. 1) to cut off power to the power portion of the connector 20A, allowing more power to be routed to one or more of the unblocked connectors 20 of FIG. 1. A star-washer type pattern is optionally stamped into the spring finger 58 on the mechanical barrier 52 to ensure good electrical contact with the pad 62 on the PCB 18. A threaded hole 53 is optionally provided on the mechanical barrier 52 and/or the panel 14 to lock the mechanical barrier 52 in the blocked position using a threaded fastener, such as a screw 55.

Figure 4:
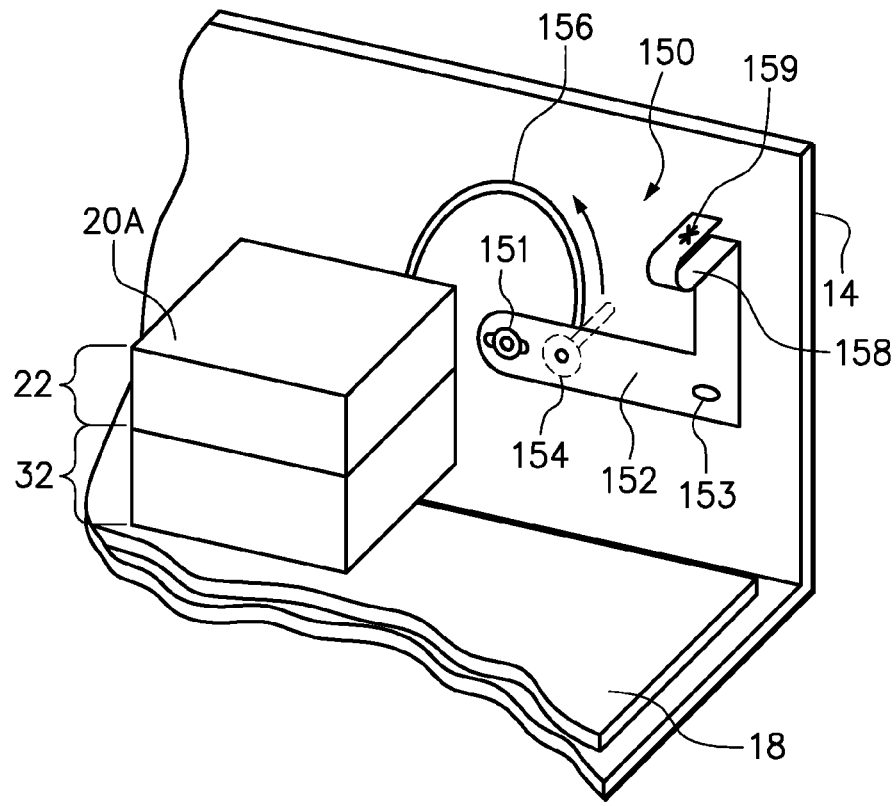
FIG. 4 is a rear perspective view of the connector having an alternative blocking mechanism including a pivotable mechanical barrier in an unblocked position.
Figure 5:
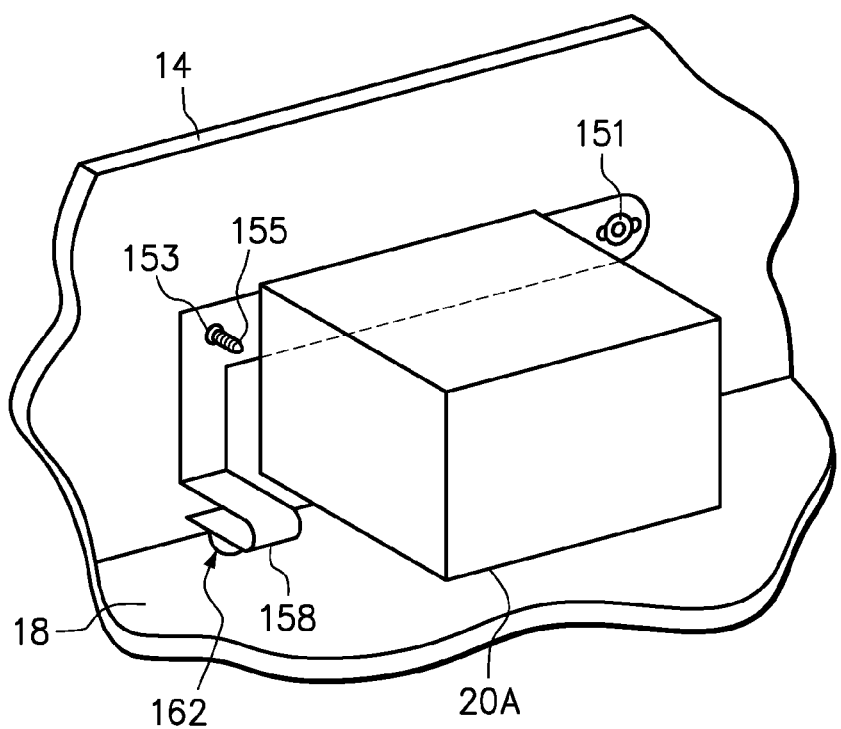
FIG. 5 is a rear perspective view of the connector and blocking mechanism of FIG. 4 with the mechanical barrier pivoted to a blocked position.

FIGS. 4-5 illustrate another embodiment of a blocking mechanism 150 with a pivotable (rather than linearly translating) mechanical barrier in the form of an arm 152. FIG. 4 is a rear perspective view of the connector 20A and blocking mechanism 150 with the pivotable arm 152 in an unblocked position. The mechanical barrier 152 is pivotably attached to the panel 14 at a pivot attachment 151. The pivot attachment 151 may include a pin, screw, or other mechanism known in the art for pivotably securing one member to another member. The blocking mechanism 150 optionally includes an arcuate groove 156 passing through the panel 14, with a handle 154 on the other (outer) side of the panel 14 for rotating the mechanical barrier 152 by hand about the pivot attachment 151. The pivot attachment 151 could alternatively be attached to the arm 152 with a screw or bolt having a screw-head or bolt-head on the outside so it could be rotated from the outside with a tool, such as a screwdriver or wrench. A spring finger 158 is provided at an end of the arm 152. A star-washer type pattern 159 is optionally stamped into the spring finger 158 on the arm 152.

FIG. 5 is a rear perspective view of the connector 20A and blocking mechanism 150 with the arm 152 rotated to a blocked position. In the blocked position, the arm 152 covers at least the upper, power portion 22 of the connector 20A. The star-washer type pattern 159 on the spring finger 158 (FIG. 4) makes electrical contact with a pad 162 on the PCB 18 to short the pad 162 to ground. This short signals the controller 15 to cut off power to the power portion of the connector 20A, allowing more power to be routed to one or more of the unblocked connectors 20 of FIG. 1. A threaded member, such as a screw 153 is threaded through the panel 14 and the arm 152 to secure the arm 152 in the blocked position.

Figure 6:
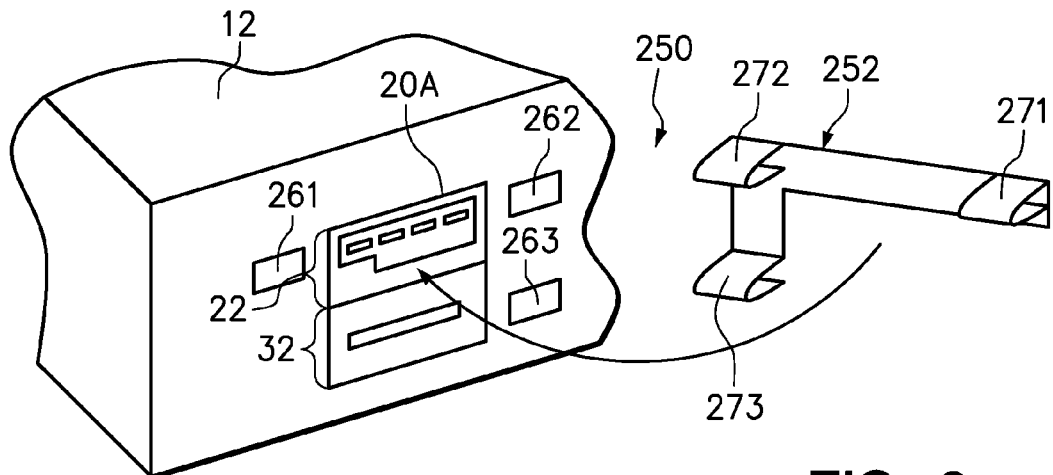
FIG. 6 is a front perspective view of the host device with an alternative, snap-in mechanical barrier removed to an unblocked position.
Figure 7:
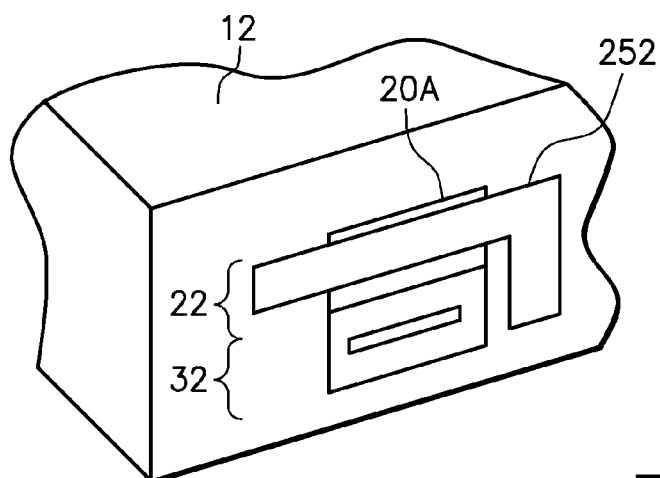
FIG. 7 is a front perspective view of the host device with the snap-in mechanical barrier of FIG. 6 snapped into the blocked position on the host device.

FIGS. 6 and 7 illustrate another embodiment of a blocking mechanism 250 with a "snap-in" mechanical barrier 252. FIG. 6 is a front perspective view of the host device 12 with the snap-in mechanical barrier 252 removed to an unblocked position. The panel 14 includes a plurality of mechanical barrier-retention apertures or holes 261, 262, 263. The snap-in mechanical barrier 252 includes three mechanical barrier-retention prongs 271, 272, 273 in positions corresponding to the positions of the holes 251-253. In particular, prong 271 corresponds to prong 261, prong 272 corresponds to prong 262, and prong 273 corresponds to prong 263. Each prong has a width slightly larger than the corresponding hole on the panel 14, and is inwardly flexible to pass into the corresponding retention hole and then "snap" back outward to an unflexed state once inserted, to retain the mechanical barrier 252 in the blocked position of FIG. 7. In the unblocked position (i.e. with the mechanical barrier 252 removed), the power portion 22 and data portion 32 of the connector 20A are unblocked, so that the peripheral-side plug could be plugged into the connector 20A.

FIG. 7 is a front perspective view of the host device 12 with the snap-in mechanical barrier 252 snapped into the blocked position. The prongs 271-273 have been inserted into the corresponding holes 261-263 (see FIG. 6). Once snapped into the blocked position of FIG. 7, the mechanical barrier 252 blocks the upper, power portion 22 of the connector 20A. The lower, data portion 32 remains unblocked, although in another embodiment the mechanical barrier 252 may be shaped to also block the data portion 32.

The three example embodiments of blocking mechanism presented above include the linearly-translating mechanical barrier (plate) of FIGS. 1-3, the pivoting mechanical barrier (arm) embodiment of FIGS. 4-5, and the snap-in mechanical barrier of FIGS. 6-7. One skilled in the art will appreciate that alternative embodiments of blocking mechanisms are also within the scope of the invention, and are not limited to the examples embodiments presented herein.

The blocking mechanisms presented in the embodiments of FIGS. 1-7 are field configurable, in that external access to the barrier is provided to allow a user to selectively block or unblock selected connectors 20. Alternatively, mechanical blocking mechanisms according to the invention may be configured permanently as a manufacturing option. As a manufacturing option, the position of the mechanical barrier may be intended as permanent after installation, and not user-reconfigurable. This can be accomplished by, for example, eliminating the handles 54 in the embodiments of FIGS. 1-3, or by eliminating external access to the arm 152 in the embodiment of FIGS. 4-5, and/or fixing the plate-type mechanical barrier 52 or arm-type mechanical barrier 152 in place such that the mechanical barrier cannot be moved after assembly. As another example of a permanent configuration, the snap-in mechanical barrier 252 of FIGS. 6 and 7 may be positioned internally to the host device 12 behind the panel 14, or secured to the connector 20 itself and/or to the printed circuit board 18, such that the snap-in mechanical barrier 252 is not accessible or removable after the unit is assembled.

Figure 8:
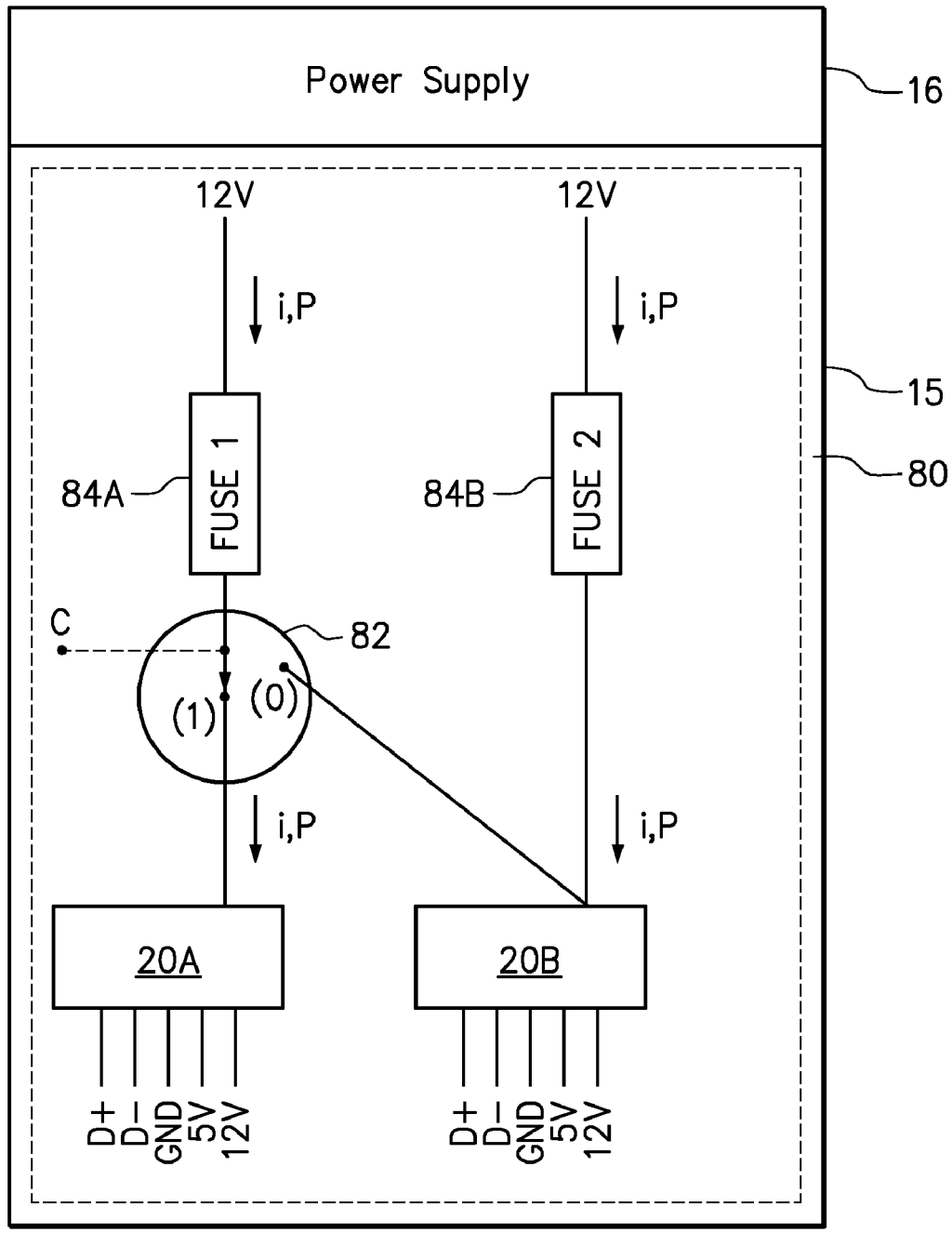
FIG. 8 is a schematic diagram of a power controller embodiment that includes a Voltage Switch Network supplying equal power and current to two unblocked connectors.

FIG. 8 is a schematic diagram of an embodiment of the power controller 15 that includes a Voltage Switch Network (VSN) 80 for controlling power from the power supply 16 to two of the Powered-USB connectors 20A, 20B. For simplicity of illustration, only the two connectors 20A, 20B are shown, although the discussion may be extended to more than two connectors. The VSN 80 includes a first fuse element 84A in line with a first 12V output from the power supply 16 and a second fuse element 84B in line with a second 12V output from the power supply 16. The power supply 16 supplies equal current "i" and power "P" to each fuse element 84A, 84B.

The VSN 80 further includes a switch 82 between the first fuse element 84A and the first connector 20A. The switch 82 is optionally embodied as a field-effect transistor (FET) 82. However, it should be recognized that the switch 82 is not limited to being an FET. Any type of switching component may be used, other examples of which include a relay or solid state switch. Operation of FET 82 is automatic as the mechanical barrier is moved from the blocked position to the unblocked position, and vice-versa. The FET 82 has two mutually-exclusive logic states 0 and 1. The logic state of the FET 82 depends on the position of the mechanical barrier used to selectively block the connector 20A. As discussed above, moving the mechanical barrier of a blocking mechanism to a blocked position according to an embodiment of the invention may bring a spring finger into contact with a pad on a PCB, shorting the pad to ground. Here, moving the mechanical barrier to the blocked position generates a control signal "C." Control signal C is grounded or at logic state 0. Thus, grounding the pad on the PCB by bringing the spring finger or other metallic feature of the mechanical barrier into contact with the pad automatically switches the FET 82 to logic state 0.

In FIG. 8, the FET 82 is in logic state 1, which corresponds to the first connector 20A being unblocked, as a result of the mechanical barrier 52 (FIGS. 1-3), 152 (FIGS. 4-5), or 252 (FIGS. 6-7) being in the unblocked position. With the FET 82 in logic state 1, equal current i and power P are supplied from the fuse elements 84A, 84B to the respective connectors 20A, 20B. The total current supplied from the power supply 16 to the two connectors 20A, 20B equals 2*i. The total power supplied from the power supply 16 to the two connectors 20A, 20B equals 2*P. In this simple example of two connectors 20A, 20B, the group power limit is 2*P and the group current limit is 2*i.

Figure 9:
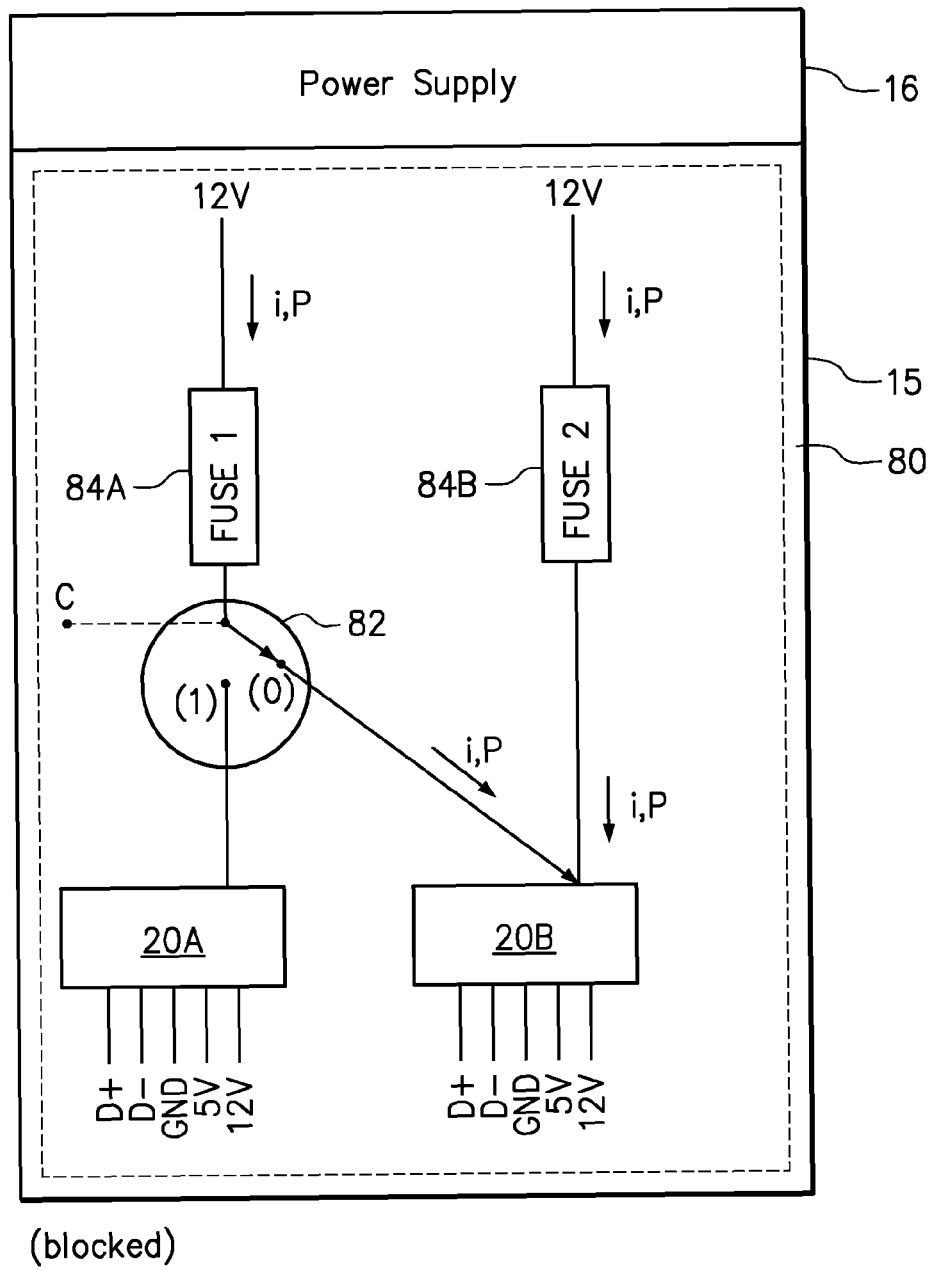
FIG. 9 is a schematic diagram of the power controller of FIG. 8, wherein the power controller has re-routed power from a blocked connector to an unblocked connector.

FIG. 9 is a schematic diagram of the power controller 15 showing the FET 82 in logic state 0, which corresponds to the first connector 20A being blocked as a result of the mechanical barrier 52 (FIGS. 1-3), 152 (FIGS. 4-5), or 252 (FIGS. 6-7) being in the blocked position. Here, the short generated by bringing a spring finger into contact with a pad on a PCB signals the controller 15 (FIG. 1) to switch the FET 82 to logic state 0, to reroute power from the first fuse element 84A to the second connector 20B. As a result, no current or power now flows to the blocked connector 20A. Instead, the current i and power P from the first fuse element 84A is re-routed to the connector 20B. The current i and power P re-routed from the first fuse element 84A combines with the current i and power P from the second fuse element 84B. In this example, power to the blocked first connector 20A is effectively shut off, while current and power to the connector 20B is effectively doubled. The group power limit of 2*P and current limit of 2*i is maintained.

The example control circuitry shown in FIG. 9 is provided merely as one example of control circuitry capable of automatically increasing power to one connector in response to the blocking of another connector. One skilled in the art having benefit of this disclosure will recognize alternative power controller configurations and methods within the scope of the invention for adjusting power to selected connectors in response to the positioning of mechanical barriers. Also, while the example of FIG. 9 is applied to two connectors, one skilled in the art having benefit of this disclosure will further recognize that the discussion may be extended, by analogy, to increasing power to any number of unblocked connectors in response to the blocking of one or more other connectors.

The example embodiments disclosed are discussed primarily in the context of Powered-USB type connectors, which include a separate power receptacle and data receptacle. In these embodiments, blocking a power portion of the connector involves blocking the power receptacle of a Powered-USB connector, while optionally leaving the data receptacle unblocked. However, the invention may be applied to other types of connectors, including standard USB connectors and serial-type connectors, having a single receptacle or plug per connector. Connectors having a single receptacle or plug per connector typically combine a power portion and data portion within the single receptacle or plug. For example, a connector may include a power portion having one or more power contacts and a data portion having one or more data contacts, wherein the power contacts and data contacts are combined within the single receptacle or plug. When applied to such a connector, the step of blocking at least the power portion of the connector may involve blocking the entire receptacle from connection with a corresponding plug.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a group of electronic connectors disposed on a host device, each electronic connector including a power portion for carrying electrical power and a data portion for carrying data;
    a power supply on the host device for supplying power to the electronic connectors;
    a blocking mechanism including a mechanical barrier moveable into a blocked position for physically blocking at least the power portion of one or more of the electronic connectors while the other electronic connectors in the group remain unblocked; and
    a power controller configured for controlling power to the group of electronic connectors and for automatically increasing an individual power limit of one or more of the unblocked electronic connectors in response to the mechanical barrier being in the blocked position.

2. The system of claim 1, wherein the power controller is configured to dynamically apportion a fixed group power limit among the unblocked electronic connectors.

3. The system of claim 1, wherein the power controller is further configured to automatically shut off power to the blocked electronic connectors in response to the moveable barrier being in the blocked position.

4. The system of claim 1, wherein the power portion comprises a power receptacle including a plurality of power contacts for receiving a power plug and the data portion comprises a data receptacle having a plurality of data contacts for receiving a data plug.

5. The system of claim 4, wherein each electronic connector is a Powered-USB connector, the power portion is a non-standard USB power portion operable for carrying non-standard USB power signaling, and the data portion is a standard USB data portion operable for carrying standard USB data signaling.

6. The system of claim 1, wherein the mechanical barrier is slidably mounted to the host device and slidable into and out of the blocked position.

7. The system of claim 1, wherein the mechanical barrier is pivotably mounted to the host device and rotatable into and out of the blocked position.

8. The system of claim 1, further comprising:
    one or more mechanical barrier-retention holes on one of the host device and the mechanical barrier; and
    one or more mechanical barrier-retention prongs on the other of the host device and the mechanical barrier in positions corresponding to the mechanical barrier-retention holes, wherein the mechanical barrier-retention prongs are configured to releasably snap into the mechanical barrier-retention holes for releasably securing the mechanical barrier in the blocked position.

9. The system of claim 1, further comprising:
    a threaded hole on the host device; and a threaded fastener configured for threadedly engaging the threaded hole on the host device for securing the mechanical barrier in the blocked position.

10. The system of claim 1, wherein the power controller comprises:
a switch configured to reroute electrical current from one or more of the blocked connectors to one or more of the unblocked connectors in response to the mechanical barrier being moved to the blocked position.

11. The system of claim 10, further comprising:
a ground terminal on the host device; and
a metal tab on the mechanical barrier positioned to contact the ground terminal when the mechanical barrier is in the blocked position, wherein contacting the ground terminal generates a control signal to change the state of the switch in response to the control signal.

12. The system of claim 1, wherein the switch comprises a field effect transistor.

13. A method, comprising:
providing electrical power to a group of electrical connectors;
blocking one or more of the electrical connectors while the other electronic connectors in the group remain unblocked; and
automatically increasing an individual power limit of one or more of the unblocked electronic connectors in response to the blocking.

14. The method of claim 13, further comprising:
dynamically apportioning a group power limit among the unblocked electronic connectors; and
dynamically enforcing the group power limit by adjusting individual power limits of the unblocked electronic connectors.

15. The method of claim 13, further comprising:
automatically shutting off power to the blocked electronic connectors in response to the blocking.

16. The method of claim 13, further comprising:
carrying non-standard USB power signaling to a non-standard USB power portion of the electronic connectors; and
carrying standard USB signaling to a standard USB portion of the electronic connectors.

17. The method of claim 13, wherein the blocking comprises:
moving a mechanical barrier into a blocked position covering at least a power portion of the electronic connectors being blocked.

18. The method of claim 13, wherein the mechanical barrier is pivotably mounted to the host device and rotatable into and out of the blocked position.

19. A method, comprising:
enforcing a group power limit on a group of electronic connectors;
enforcing individual power limits on the electronic connectors;
selectively blocking connection to one or more of the electronic connectors; and
dynamically re-apportioning the group power limit among the unblocked connectors.

* * * * *